United States Patent [19]
Sevec et al.

[11] 3,917,369
[45] Nov. 4, 1975

[54] ADJUSTABLE EXTENDER FOR INSTRUMENT MODULE

[75] Inventors: John B. Sevec, Joliet; Albert D. Stein, Park Forest, both of Ill.

[73] Assignee: The United States of America as represented by the United States Energy Research and Development Administration, Washington, D.C.

[22] Filed: Aug. 26, 1974

[21] Appl. No.: 500,788

[52] U.S. Cl. ............. 312/333; 174/DIG. 9; 174/69; 174/86; 372/223
[51] Int. Cl.² ................. H01B 07/06; H01R 05/00
[58] Field of Search .......... 312/223, 322, 323, 326, 312/329, 333; 317/101 CC, 101 C, 101 DH, 317/129, DIG. 9 XR; 174/52 R, 174/69 XR, 86 XR

[56] References Cited
UNITED STATES PATENTS
| | | | |
|---|---|---|---|
| 3,030,165 | 4/1962 | Nagy | 312/322 |
| 3,479,444 | 11/1969 | Hus | 174/8 C |
| 3,792,189 | 2/1974 | Stengel | 174/DIG. 4 |

Primary Examiner—Casmir A. Nunberg
Attorney, Agent, or Firm—Dean E. Carlson; Arthur A. Churm; Hugh W. Glenn

[57] ABSTRACT

A blank extender module used to mount an instrument module in front of its console for repair or test purposes has been equipped with a rotatable mount and means for locking the mount at various angles of rotation for easy accessibility. The rotatable mount includes a horizontal conduit supported by bearings within the blank module. The conduit is spring-biased in a retracted position within the blank module and in this position a small gear mounted on the conduit periphery is locked by a fixed pawl. The conduit and instrument mount can be pulled into an extended position with the gear clearing the pawl to permit rotation and adjustment of the instrument.

4 Claims, 3 Drawing Figures

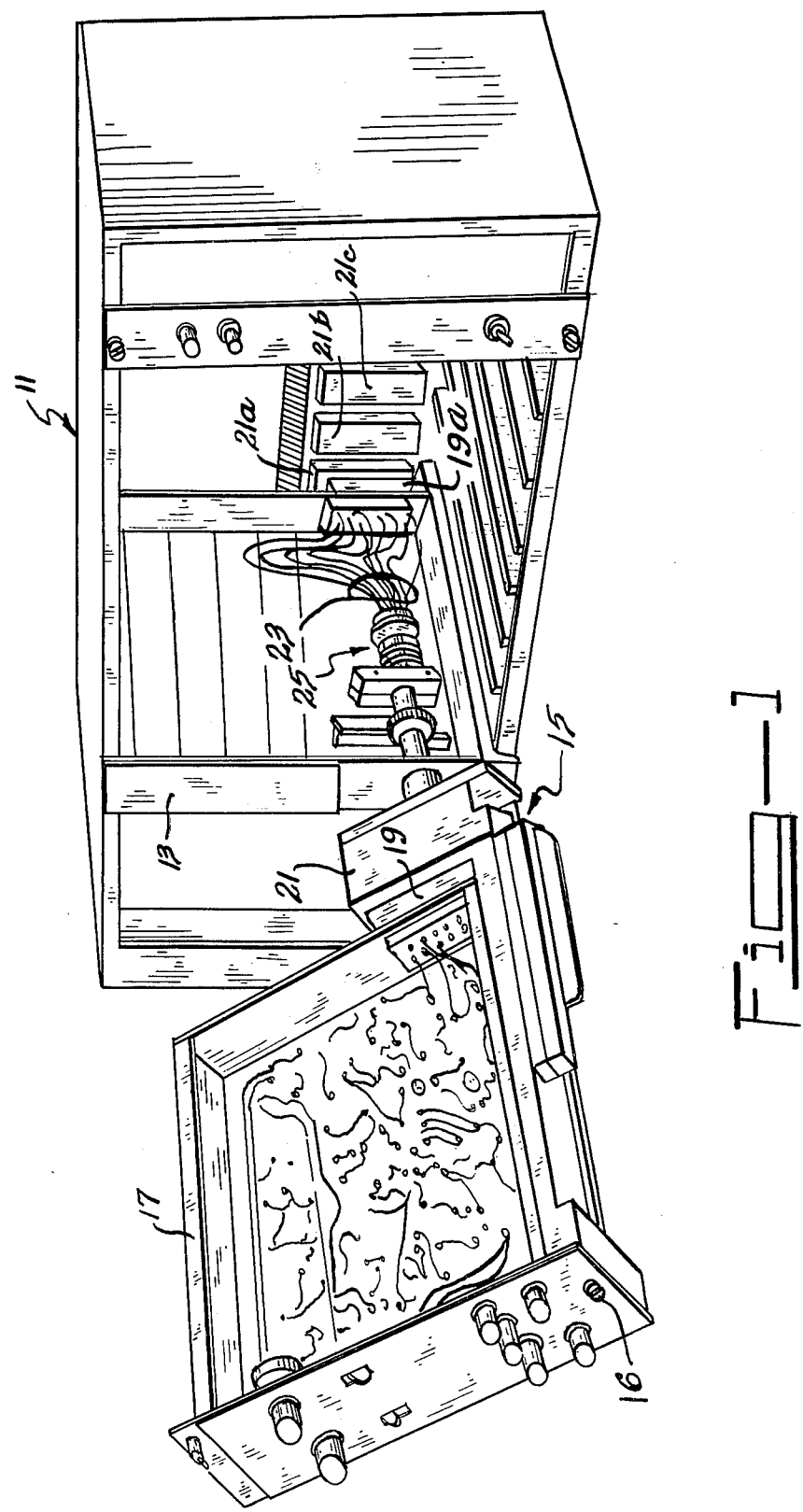
Fig—1

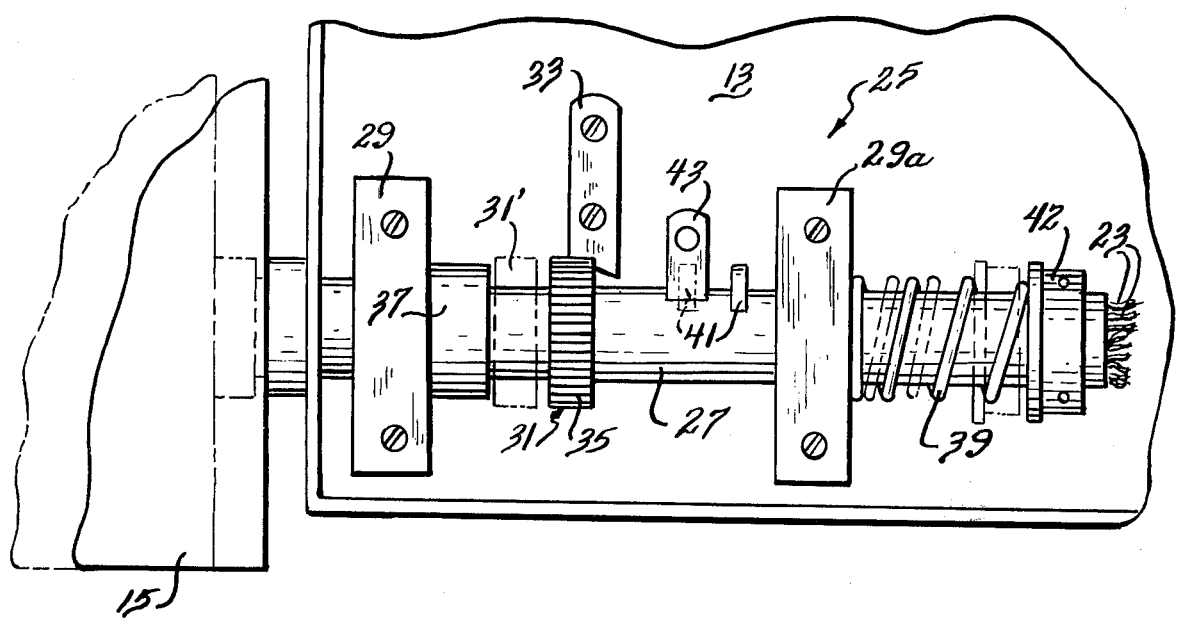
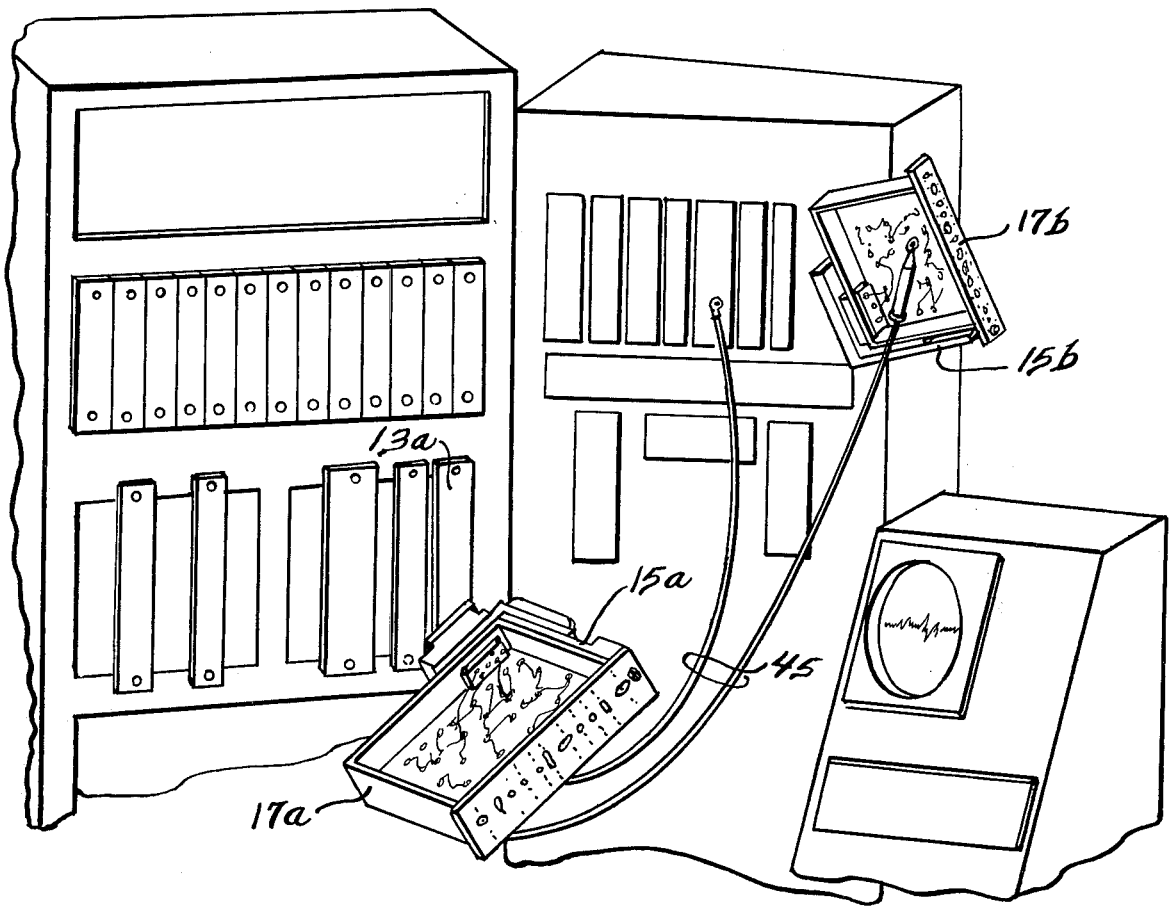

ADJUSTABLE EXTENDER FOR INSTRUMENT MODULE

CONTRACTUAL ORIGIN OF THE INVENTION

The invention described herein was made in the course of, or under, contract with the UNITED STATES ATOMIC ENERGY COMMISSION.

BACKGROUND OF THE INVENTION

The present invention relates to an improvement in blank modules adapted for use within an instrument console for positioning an instrument module in an accessible forward location from the console. It is particularly suitable for use with standard nuclear instrument modules as have been standardized in respect to size, connections, and various other features. (See STANDARD NUCLEAR INSTRUMENT MODULES, TID-20893, Rev. 3, U.S. Atomic Energy Commission, December 1969, available from the Superintendent of Documents, U.S. Government Printing Office, Washington, D.C. 20402.)

The standard nuclear instrument modules (NIM modules) are designed to permit interchangeability of various modular instrumentation within the instrument console. The interchangeability generally relates to physical dimensions and electrical power supply or output and does not concern the instrument circuit design. The widespread use of NIM modules in the packaging of electronic equipment has demanded some provisions for fast, convenient testing and trouble shooting without disturbing companion units. At present manufacturers make available an extender module that brings instrumentation out beyond the base of the console and makes the circuitry accessible under operating conditions. This arrangement offers only a single orientation of the instrument module that is not always the most advantageous, particularly when several instrument packages are being tested simultaneously by a single operator.

Therefore, in view of these limitations in prior art devices, it is an object of the present invention to provide a blank module for supporting instrumentation in frontal extension of an instrument console for increased accessibility.

It is also an object to provide a rotatable module mount on an extender module for adjusting the attitude of instrumentation under test conditions.

SUMMARY OF THE INVENTION

A blank, extender module is adapted to be received within an instrument console in the place of an instrument module undergoing test. The blank includes a rotatable mount for supporting the instrumentation in forward extension from the console face along with instrument-coupling means for interconnecting the instrumentation to the console. The instrumentation supported on the instrument mount can thereby be pivoted about a horizontal axis to attain the desired attitude.

In a more specific aspect of the invention, the rotatable mount is supported at one end of a rotatable conduit projecting from the face of the blank module. The rotatable conduit is longitudinally positionable in an extended and in a retracted position within the blank module. The conduit is provided with a gear having circumferential teeth that engage a fixed pawl to act as a rotational lock when the conduit is in its retracted position. The gear teeth clear the pawl to permit rotation of the conduit and instrument mount when the conduit is pulled into its extended position against the force of a spring device urging the conduit towards its retracted position.

BRIEF DESCRIPTION OF THE DRAWINGS

The present invention is illustrated in the accompanying drawings wherein:

FIG. 1 is a perspective view showing the adjustable extender module of the present invention supporting instrumentation in front of an instrument console.

FIG. 2 is an enlarged elevation view of one portion of the adjustable extender module.

FIG. 3 is a perspective view showing two instrument modules extended beyond a console face on adjustable extender modules to permit simultaneous testing.

DESCRIPTION OF THE PREFERRED EMBODIMENT

Referring now to FIG. 1, where an instrument console 11 is illustrated as a single bin for supporting a horizontal row of instrument modules. A blank module 13 is shown installed within the instrument console and includes an instrumentation mount 15 supporting an instrument module 17. Suitable fastening devices such as a threaded bolt or latch 16 secure module 17 to the mount. The instrument module 17 is disposed forwardly from the face of the console in an accessible location to permit testing and servicing. Module 17 is provided with a first connector half 19 of a plug and socket connection in mating engagement with the second half of that connection 21 carried by the blank module 13. Similar mating halves are mounted within the instrument console and are illustrated at 21a, 21b and 21c. The opposing end of the blank module incorporates a connector half 19a comparable to that carried by the instrument module. As is seen, instrument modules such as 17 can be plugged into any position within the instrument console by mating connector half 19 to complementary halves illustrated at 21a, 21b and 21c. Likewise, the blank module 13 could be moved to any of these other positions with the instrument module 17 carried in its extended position as illustrated.

Blank module 13 includes a plurality of instrumentation leads 23 passing between its connector halves 21 and 19a. These leads provide power and transmit signals to and from the instrument module 17 from other devices within the console 11. The rear portion of instrumentation leads 23 connected to coupling half 19a are uncovered and unrestrained within blank module 13. The forward portion of the instrumentation leads 23 pass through a rotatable conduit assembly 25 adjacent to their connection with connector half 21. The unrestrained portion of leads 23 permits rotation of instrument mount 15 along with connector half 21, while maintaining the opposite connections 19a and 21a stationary.

In FIG. 2 a more detailed illustration of the rotatable assembly 25 is shown. Assembly 25 includes a horizontal conduit 27 rotatably mounted within two bearing members 29 and 29a. Conduit 27 extends forwardly from the blank module 13 to support the rotatable instrument mount 15. Leads 23 pass through the conduit to the connector half provided on instrument mount 15. A gear 31 is mounted on the conduit between bearing members 29 and 29a at a location which is alignable with a pawl 33 mounted on the blank module wall.

Gear 31 includes longitudinally aligned teeth 35 about is circumference that are engaged by pawl 33 to prevent rotation of conduit 27. Conduit 27 is slidably disposed within bearing members 29 and 29a to permit its longitudinal disposition in a retracted position, as shown with pawl 33 engaging the teeth of gear 31, and in an extended position, with gear 31 forwardly disposed clear of pawl 33 as indicated by the dashed representation at 31'. The extended position of conduit 27 is limited when gear 31 abuts a spacing member 37 disposed adjacent to the forward bearing member 29.

At the opposing end of conduit 27 from instrument mount 15, a coiled spring 39 is disposed about the conduit periphery. Spring 39 is compressed between the rear face of bearing member 29a and a bushing 42 coaxially mounted at the rearward end of conduit 27. Since bearing member 29a is fixedly mounted on the wall of blank module 13, spring 39 urges bushing 42 and conduit 27 towards its retracted position as shown. The operator, by pulling forward on instrument mount 15, will compress spring 39 and move the rotatable conduit assembly 25 into the extended position illustrated in the dashed lines. In the extended position, gear 31 forwardly clear of pawl 33 to permit rotation of the instrument mount through an angle of about 270°. The rotation is limited by a small tab or stop 41 fixedly mounted on the periphery of conduit 27 and an aligned stop block 43 fixedly mounted on the wall of blank module 13. Rotation can proceed in either a clockwise or a counterclockwise direction until tab 41 engages block 43.

Referring now to FIG. 3 where two instrument modules 17a and 17b are shown supported on rotatable instrument mounts 15a and 15b as a part of two blank modules illustrated at 13a. By pivoting the instrument modules on their rotatable mounts, the operator is able to simultaneously view and connect test leads 45 to the desired side of the modules. It is seen that instrument module 17a is rotated into an inverted orientation in order to expose the side of the module normally facing the opposite direction. Through use of this rotatable feature, the operator can have increased and simultaneous accessibility to a number of instruments for testing and making electrical repairs.

It will be clear that the present invention provides a novel device for supporting instrumentation in an accessible position beyond the front of an instrument console face. The instrumentation can be rotated through a wide angle and conveniently maintained at a desired angle to facilitate testing and maintenance of the instrument. Further illustration of this device can be found in A ROTATABLE EXTENDER FOR SERVICING EQUIPMENT EMPLOYING NUCLEAR INSTRUMENT MODULES, by Sevec and Stein, ANL-8048, Argonne National Laboratory, 1973. It will also be clear that, although the invention has been described in detail in respect to the preferred embodiment, modifications in materials and components known to those skilled in the art can be made in accordance with the invention as defined in the appended claims.

The embodiments of the invention in which an exclusive property or privilege is claimed are defined as follows:

1. In a blank module adapted to be received within an instrument console in place of an instrument module, said instrument console comprising a housing for containing a plurality of instrument modules each of which having instrumentation coupled to said console through mating, connector halves, one of said mating connector halves being carried by said console and said other mating connector half being carried by said instrument module, said blank module comprising a structural frame for insertion within said console in place of said instrument module, an instrument mount carried by said frame for supporting said instrument module in forward and accessible extension from said console and coupling means supported by said frame for interconnecting said instrument module to said console, said coupling means including first and second connector halves at opposite ends of said blank module with interconnecting instrumentation leads therebetween, said first connector half adapted to matingly engage said connector half carried by said console and said second connector half adapted to matingly engage said connector half carried by said instrument module, the improvement comprising rotatable support means within said blank module for supporting said instrument mount in a plurality of angular dispositions in respect to said blank module, said rotatable support means including releasable locking means for locking said instrument mount in each of said plurality of angular dispositions and for releasing said instrument mount for rotation to other of said angular dispositions.

2. The blank module of claim 1 wherein said rotatable support means comprises a horizontal conduit rotatably supported about its longitudinal axis within said blank module, said conduit extending from supportive engagement with said instrument mount and said second connector half to a location to within said blank module, spaced from said first connector half, said instrumentation leads including a portion of length, towards said second connector half, contained within said conduit and a second portion of length, towards said first connector half, outside said conduit to permit rotation of said conduit relative to said first connector half.

3. The blank module of claim 2 wherein said conduit is longitudinally positionable in an extended and a retracted position within said blank module, said releasble locking means comprises on said conduit a coaxially mounted gear having circumferential teeth, a fixed pawl attached to said blank module in engagement with said gear teeth when said conduit is in said retracted position and clear of said gear teeth when said conduit is in said extended position, and spring means for urging said conduit into said retracted position.

4. The blank module of claim 2 wherein interchangeable plug and socket connections are included from said instrumentation leads in said blank module to said instrument module and from said leads to said console, said instrument module being connectable to said console both directly and through said blank module, and said instrumentation leads including a rotatable portion of length outside said conduit adjacent to said plug and socket connections of said console.

* * * * *